United States Patent [19]

Urban

[11] 4,308,312

[45] Dec. 29, 1981

[54] DIELECTRIC FILMS WITH INCREASED VOLTAGE ENDURANCE

[75] Inventor: Raymond C. Urban, Ballston Lake, N.Y.

[73] Assignee: General Electric Company, Waterford, N.Y.

[21] Appl. No.: 169,367

[22] Filed: Jul. 16, 1980

Related U.S. Application Data

[63] Continuation-in-part of Ser. No. 60,234, Jul. 24, 1979, abandoned.

[51] Int. Cl.$^3$ .................... B32B 5/16; B32B 19/04; B32B 19/06
[52] U.S. Cl. .................... 428/241; 428/219; 428/242; 428/283; 428/332; 428/336; 428/324; 428/363; 428/329; 428/693; 428/458; 428/480; 428/701
[58] Field of Search .............. 428/329, 324, 363, 539, 428/205, 241, 242, 283, 480, 458, 332, 336, 219, 701, 693

[56] References Cited

U.S. PATENT DOCUMENTS

| | | | |
|---|---|---|---|
| 2,156,083 | 4/1939 | Dalton | 428/328 |
| 2,748,019 | 5/1956 | Schramm | 428/328 |
| 2,763,315 | 9/1956 | Berberich | 428/324 |
| 3,066,180 | 11/1962 | Virsberg | 74/73 |
| 3,470,013 | 9/1969 | Wagner | 428/329 |
| 3,470,045 | 9/1969 | Bronnvall | 428/324 |
| 3,514,326 | 5/1970 | Stow | 428/328 |
| 3,556,925 | 1/1971 | Mertens | 428/324 |
| 3,592,711 | 7/1971 | Senarclens | 428/324 |
| 3,655,263 | 4/1972 | Hoffman | 428/329 |
| 3,746,566 | 7/1973 | Hiratsuba | 428/329 |
| 3,780,206 | 12/1973 | Reynolds | 428/329 |
| 3,801,427 | 4/1974 | Morishita | 428/329 |
| 3,935,375 | 1/1976 | Ichiba | 428/463 |
| 4,146,031 | 3/1979 | Fujiyana | 428/329 |
| 4,157,414 | 6/1979 | Smith | 428/324 |

*Primary Examiner*—Ellis P. Robinson
*Attorney, Agent, or Firm*—Morgan, Finnegan, Pine, Foley & Lee

[57] ABSTRACT

A dielectric film with improved voltage endurance is disclosed. The dielectric film is provided with an aluminum oxide powder dust coating which increases the life of the film by improving the voltage endurance. A film comprising mica reinforced with polyester and/or glass is especially useful in the manufacture of insulating tapes and cloths found in electrical devices. Best voltage endurance is provided by fumed aluminum oxide particles which are in the colloidal size range and which are more than 99.5% pure.

10 Claims, No Drawings

DIELECTRIC FILMS WITH INCREASED VOLTAGE ENDURANCE

This is a continuation-in-part of my copending application Ser. No. 060,234 filed on July 24, 1979 now abandoned.

This invention relates to providing dielectric films with an aluminum oxide dust coat to improve voltage endurance and increase the life of the films, and to the coated dielectric films themselves.

BACKGROUND OF THE INVENTION

It is known that dielectric films are used on a large scale for insulation purposes in applications such as transformers, generators and motors. A common problem associated with electrical apparatus so-insulated is that in high voltage applications, an electrostatic potential gradient along the surface of the insulator is created. This electrostatic potential gradient in the presence of air or any other gas will cause ionization of the gas particles which is called the corona effect. The corona effect causes the breakdown of the surface of the electrical insulation and will eventually totally destroy the insulating material. This problem is especially acute in high voltage applications such as generators and motors where a very large potential gradient is created.

As noted in U.S. Pat. No. 3,066,180 to Virsberg et al. many efforts have been made in attempting to obviate this problem. One method was to coat the surface of the insulation with a conductor having a suitable resistance. However, this method is rather ineffective in preventing the corona effect from appearing. Another method of obviating this problem is disclosed in the above cited patent and includes coating the insulator with a conductive component such as silicon carbide, which will further lessen the corona effect. However, the conductive coating is to be applied in either a thermosetting or air drying varnish which must then be placed on the insulator and then finally cured.

It is clear however, that certain problems are inherent with this method, in that many cumbersome and costly steps must be taken to apply and cure the varnish coating. In addition, the varnish coating substantially adds to the thickness of the dielectric film. It is desirable that insulators made from dielectric films be produced in uniform, thin sheets with simple techniques similar to those used in standard paper making.

It is known, for example, to heat mica to loosen interlaminar bonds, then to slurry it in water, and finally to form it into a mat on a paper making machine. The product of this procedure is then wound into rolls for later use as sheet insulation or as tapes and the like. Such a dielectric is rather fragile, and resins, such as silicones, polyesters, epoxys, polyimides, polyolefins and the like, can be added to fill voids in the dielectric. Alternatively, or in addition, thinner resin films, e.g., poly(ethylene terephthalate) films can be used to strengthen the dielectric films, and/or there can be added layers of glass cloth or undirectional glass filament mats to strengthen such sheets. In any case, it is further desirable that the insulator be as thin as possible so that when used in electrical devices the tape or sheet insulator will occupy a small area, thereby allowing for an increase in the size of the current carrying components. This arrangement will permit an increased output from electromagnetic components having a similar overall size, thereby lowering the manufacturing cost while improving operating performance.

It is noted that the use of aluminum or aluminum oxide coatings is found in the prior art. As an example, U.S. Pat. Nos. 2,748,019 to Schramm, Jr., and 2,156,083 to Dalton, aluminum is used in textile fabrics for heat insulation and in a moisture protected gum coating respectively. In U.S. Pat. Nos. 3,935,375 to Ichiba, et al, and 3,514,326 to Stow, aluminum is used as a conductor in laminated sheathed cable and a conductive tape. In U.S. Pat. No. 3,780,206 to Reynolds, aluminum oxide is provided in fibrous sheet material to be used as a conductor or a semi-conductor.

As noted above, efforts in the prior art to produce dielectric films with enhanced resistance to high voltage breakdowns resulted in procedures that were complex, time consuming, and costly. In addition, the resulting tapes had an increased thickness due to the varnish coatings. Efforts to reduce the thickness of the insulators would only result in a corresponding decrease in the structural integrity of the tape. Therefore, it would be desirable to more easily produce a dielectric tape having properties which inhibit the corona effect and decrease the likelihood of breakdown. Further, it is desirable that the dielectric tapes be of minimal thickness and yet still be capable of being utilized in high voltage applications.

It is therefore an object of the subject invention to provide a dielectric film with an increased voltage endurance that can be manufactured at low costs. It is a further object of the subject invention to provide a dielectric film with minimum thickness. Still another object is to provide a mica-based dielectric tape strengthened with resin and/or glass fiber reinforcement having increased voltage endurance.

DESCRIPTION OF THE INVENTION

According to the present invention there is provided a dielectric film having increased voltage endurance and corona resistance. More particularly, a dielectric film is provided which will have a longer life before breakdown when subjected to a high electrostatic potential gradient. The improvement comprises providing at least one side of the film with an aluminum oxide dust coating; preferably the coating is of fumed aluminum oxide.

Furthermore it has been found that best voltage endurance is provided by a coating of aluminum oxide particles which are at least 99.5% pure, which are in the colloidal size range with a specific surface area of 50 to 150 square meters per gram and an average primary or "ultimate" particle size of 5 to 50 nanometers, and which provide a suspension which has an acid pH when the particles are slurried in distilled water. Preferably the coating is at least 10 particles thick.

In the practice of the invention, dielectric film is employed, such as those used for insulating purposes in electrical devices, e.g., motors, generators, transformers and armatures and the like. The final product film is generally in the form of reinforced tapes, cloths, and wrappers. Depending on the particular application and the flexibility requirements, the film may be reinforced with glass cloth or non-woven unidirectional yarn. The resulting film is provided with a coating of aluminum oxide dust derived from an aqueous dispersion. The resulting dusted film exhibits a voltage endurance and resistance to the corona effect superior to that of an uncoated film. Furthermore, the thickness of the film may be as small as 0.001 of an inch and thus is suitable for use in various shop practices and systems including dry tape designs, molded and cured techniques, and vacuum pressure impregnated structures.

DESCRIPTION OF THE PREFERRED EMBODIMENT

A conventional dielectric film is formed by standard heating and slurrying mica, then depositing a web on a paper making machine. The resulting mat is treated with resin, reinforced with glass filaments and poly(ethylene terephthalate) film, and then dusted with a coating of aluminum oxide. The aluminum oxide is applied from an aqueous suspension which has approximately 20% aluminum oxide dispersed. Although both sides of the tape were dusted with a coating of aluminum oxide in the test procedure described below, for certain applications, dusting on only one side of the tape may be required.

If desired, the film can comprise mica impregnated with a solventless polyester, which is then cured prior to the application of said dust coating.

The preferred aluminum oxide powder used for coating the mica tape is Alon (an aluminum oxide powder of Cabot Corp., Boston, Mass.) since this has given very satisfactory results. Fumed Aluminum Oxide C (made by Degussa Corp., Teterboro, N.J. from Aluminum Chloride) is similar and is equally satisfactory. It is 99.6% pure $Al_2O_3$. After calcination for two hours at 1000° C. it contains less than 0.1% each of $SiO_2$ and $TiO_2$, less than 0.2% of $Fe_2O_3$, less than 0.2% of sodium as $Na_2O$ and less than 0.5% of sulfur as $SO_3$. A 5% by weight suspension of the powder in distilled water is slightly acid (pH 4–6). During calcination the powder loses less than 3% of its weight. It has a specific surface area (B.E.T. nitrogen absorption method) of $100\pm15$ square meters per gram, and an average primary particle size of 20 nanometers. It contains 0.05% by weight of grit (according to Mocker, DIN 53-580). Alon substantially conforms with these specifications.

Voltage stress tests were performed on treated and untreated tapes. Ten kilovolts were applied to five layers of specimen (untreated) tapes, which resulted in approximately 140 volts per mil. The average voltage life of the untreated tape was 355 hours, while the average voltage life of the tape treated with aluminum oxide according to the present invention was 675 hours. Specifically, tapes of the General Electric series called MICA MAT were employed. The particular tape tested is especially suitable to use in form wound motor coils. The tape is composed of five layers of ¾" mica mat tape, ½ lap, reinforced with a non-woven glass yarn on one side and a polyester film on both sides and having a nominal finished thickness of 0.006 of an inch.

It is noted that by dusting the tapes with aluminum oxide it is possible to produce tape by a simple technique, with the resulting tape being of minimum thickness, yet having good voltage endurance characteristics. As noted above, a thinner tape allows designers and manufacturers to place more insulation in less space thereby leaving a greater area for increasing the current carrying capacity of the components. This results in decreased manufacturing costs and overall improved operating performance.

The term "film" used herein and in the appended claims is contemplated in its broadest sense, to include, e.g., dielectric sheets, tapes, laminates, substrate-supported coatings, and the like.

It is to be understood that changes may be made in the particular embodiment of the invention and in light of the above teachings. For example, the aluminum oxide can also be included as an added component in any adhesive layer used to bond a polyester film and/or a glass web into the dielectric substrate. Furthermore, instead of polyesters, epoxy, silicone, polyimide, polyolefin, etc., impregnants can be used. All such modifications will be within the full scope of the invention as defined in the appended claims.

I claim:

1. An improved dielectric insulating film which carries on at least one side an aluminum oxide dust coating and comprises a resin-impregnated mica mat reinforced with glass cloth or non-woven glass yarn and a polyester film.

2. An improved film as recited in claim 1 wherein said polyester film is thinner than said mat.

3. An improved film as recited in claim 1 wherein said film comprises a mica mat impregnated with a cured solventless polyester.

4. An improved film as recited in claim 1 comprising a layer of an adhesive which contains aluminum oxide powder.

5. An improved film as recited in claim 1 having a thickness of at least about 0.001 inch.

6. An improved film as recited in claim 1 wherein the aluminum oxide dust is at least 99.5% pure.

7. An improved film as recited in claim 1 wherein the aluminum oxide dust is composed of fumed aluminum oxide particles in the colloidal size range.

8. An improved film as recited in claim 1 wherein the aluminum oxide dust is composed of particles having a specific surface area in the range of 50 to 150 square meters per gram.

9. An improved film as recited in claim 1 wherein the coating of aluminum oxide dust particles is at least 10 particles thick.

10. An improved film as recited in claim 1 wherein the aluminum oxide is acidic.

* * * * *